US007702789B2

(12) United States Patent
Cromer et al.

(10) Patent No.: US 7,702,789 B2
(45) Date of Patent: Apr. 20, 2010

(54) APPARATUS, SYSTEM, AND METHOD FOR REASSIGNING A CLIENT

(75) Inventors: Daryl C. Cromer, Apex, NC (US); Howard J. Locker, Cary, NC (US); Randall S. Springfield, Chapel Hill, NC (US); Rod D. Waltermann, Rougemont, NC (US)

(73) Assignee: International Business Machines Corporation, Armonk, NY (US)

( * ) Notice: Subject to any disclaimer, the term of this patent is extended or adjusted under 35 U.S.C. 154(b) by 975 days.

(21) Appl. No.: 11/266,147

(22) Filed: Nov. 3, 2005

(65) Prior Publication Data

US 2007/0101001 A1 May 3, 2007

(51) Int. Cl.
*G06F 15/173* (2006.01)
(52) U.S. Cl. .................. 709/226; 709/202; 709/205; 709/221
(58) Field of Classification Search .................. 709/201
See application file for complete search history.

(56) References Cited

U.S. PATENT DOCUMENTS

| | | | | |
|---|---|---|---|---|
| 4,564,903 | A * | 1/1986 | Guyette et al. | 711/201 |
| 5,608,876 | A * | 3/1997 | Cohen et al. | 710/300 |
| 5,987,225 | A * | 11/1999 | Okano | 358/1.13 |
| 6,418,540 | B1 * | 7/2002 | Dempsey et al. | 714/13 |
| 6,578,066 | B1 | 6/2003 | Logan et al. | 709/105 |
| 6,609,148 | B1 | 8/2003 | Salo et al. | 709/217 |
| 6,779,134 | B1 * | 8/2004 | Laviolette et al. | 714/38 |
| 7,072,820 | B1 * | 7/2006 | Bailey et al. | 703/17 |
| 7,437,517 | B2 * | 10/2008 | da Silva et al. | 711/141 |
| 2002/0107990 | A1 * | 8/2002 | Johnson et al. | 709/250 |
| 2002/0158900 | A1 * | 10/2002 | Hsieh et al. | 345/738 |
| 2002/0161873 | A1 | 10/2002 | McGuire | 709/223 |
| 2002/0161874 | A1 | 10/2002 | McGuire | 709/223 |
| 2002/0194497 | A1 | 12/2002 | McGuire | 713/201 |
| 2003/0065708 | A1 * | 4/2003 | Jacobs et al. | 709/201 |
| 2003/0158887 | A1 * | 8/2003 | Megiddo | 709/201 |
| 2003/0237084 | A1 * | 12/2003 | Neiman et al. | 718/102 |

(Continued)

OTHER PUBLICATIONS

Testa S; Chou W, The Distributed Data Center; Front-End Solutions, IT Professional, vol. 6, No. 3, pp. 26-32 May-Jun. 2004.
Valeria Cardellini, Emiliano Casalicchio, Michele Colajanni and Philip S.Yu, The State of the Art in Locally Distributed Web-Server Systems, ACM Computing Surveys, vol. 34, No. 2, Jun. 2002, pp. 263-311.

*Primary Examiner*—Firmin Backer
*Assistant Examiner*—Jonathan Bui
(74) *Attorney, Agent, or Firm*—Kunzler & McKenzie (57) ABSTRACT

An apparatus, system, and method are disclosed for reassigning a client. A selection module selects a second computation module that is hardware compatible with a first computation module. A suspension module suspends a software process for a client executing on the first computation module. An execution state module copies a computation module execution state of the first computation module to the second computation module. A memory map module copies a memory map of a software process image associated with the software process and stored in a first storage system from the first computation module to the second computation module. In one embodiment, a resumption module resumes the software process executing on the second computation module.

17 Claims, 9 Drawing Sheets

U.S. PATENT DOCUMENTS

| | | | |
|---|---|---|---|
| 2004/0024891 A1* | 2/2004 | Agrusa et al. | 709/230 |
| 2004/0117476 A1 | 6/2004 | Steele et al. | 709/224 |
| 2005/0151987 A1* | 7/2005 | Kawaura et al. | 358/1.13 |
| 2005/0237330 A1* | 10/2005 | Stauffer et al. | 345/531 |
| 2005/0267929 A1* | 12/2005 | Kitamura | 709/201 |
| 2007/0073693 A1* | 3/2007 | Harris et al. | 707/8 |

* cited by examiner

APPARATUS, SYSTEM, AND METHOD FOR REASSIGNING A CLIENT

BACKGROUND OF THE INVENTION

1. Field of the Invention

This invention relates to reassigning a client and more particularly relates to seamlessly reassigning a client among computation modules such as server blades in a data center.

2. Description of the Related Art

A data processing device such as a computer workstation, a terminal or the like, herein referred to as a client, may often employee a remote computational module to execute one or more software processes. The remote computational module may be a server. In a certain embodiment, the computation module is a server blade, a modular server with one or more processors, memory, interconnection logic, and communication capabilities residing in an enclosure such as a rack mounted chassis with a plurality of other server blades. The enclosure may include storage systems, storage interfaces, and communication interfaces. A data center may include a plurality of enclosures.

The client may communicate a request or a beacon to one or more data centers, requesting association with a computation module. A data center may respond to the beacon, communicating the ability of the data center to associate the client with a computation module. A predetermined list may direct the association of the client to a computation module of a specified data center. For example, the list may direct the association of the client with one of the computation modules with sufficient spare processing bandwidth in a first data center. Spare processing bandwidth may be spare time during which the computation module is not executing another software process. If no computation module has sufficient spare processing bandwidth in the first data center, the computation module may direct the association of the client to a computation module with sufficient spare processing bandwidth in a second data center.

The data center typically associates the client to computation modules with sufficient processing bandwidth, response latency or time required for communications to pass between the client and the computation module, and storage latency or time required for communications to pass between the computation module and a storage system such that the computation module may provide an expected level of service to the client. For example, the data center may associate a first client with a first computation module of which ten percent (10%) of processing bandwidth is utilized by a second client rather than associate the first client with a second computation module of which eighty percent (80%) of processing bandwidth is utilized by a third client.

Unfortunately, the available computation module processing bandwidth may change after the first client is associated with the first computation module. For example, the processing bandwidth of the first computation module utilized by the second client may increase to ninety percent (90%) of processing bandwidth. The second client may increase utilization of processing bandwidth by executing a processing intensive software process such as a virus scan process or the like. Such a change in available processing bandwidth seriously degrades the level of service to the first client.

When the level of service to a client is sufficiently degraded, the data center may reassign the client to a computation module capable of better providing the acceptable level of service. For example, the data center may reassign the client from the first computation module to a second computation module. Unfortunately, reassigning the client may further degrade the service to the client and may require suspending and/or terminating one or more software processes. For example, the software process initially executed on a first computation module may appear completely unresponsive to the client while the client is reassigned to the second computation module. Thus reassigning the client may degrade service more than leaving the client associated with a computation module without sufficient processing bandwidth.

In addition, the response latency between the second computation module and the client may be inadequate to provide the expected level of service. The storage latency between the second computation module and a second storage system may also be inadequate.

From the foregoing discussion, it should be apparent that a need exists for an apparatus, system, and method that seamlessly reassign a client between computation modules. Beneficially, such an apparatus, system, and method would improve the level and consistency of service to the client.

SUMMARY OF THE INVENTION

The present invention has been developed in response to the present state of the art, and in particular, in response to the problems and needs in the art that have not yet been fully solved by currently available methods of reassigning a client. Accordingly, the present invention has been developed to provide an apparatus, system, and method for reassigning a client that overcome many or all of the above-discussed shortcomings in the art.

The apparatus to reassign a client is provided with a logic unit containing a plurality of modules configured to functionally execute the necessary steps of selecting a second computation module, suspending the execution of a software process, copying the computation module execution state from a first computation module to the second computation module, and copying the memory map of the software process image from the first computation module to the second computation module. These modules in the described embodiments include a selection module, a suspension module, an execution state module, and a memory map module.

The selection module selects a second computation module. The second computation module is hardware compatible with a first computation module that is executing a software process for a client. The selection module may also select the second computation module because the second computation module has spare processing bandwidth to execute the software process.

The suspension module suspends the software process executing on the first computation module. The suspended first computation module does not accept client input such as input from a user through a keyboard and/or pointing device. In addition, the first computation module may not communicate to the client.

The execution state module copies a computation module execution state from the first computation module to the second computation module. The computation module execution state may include the values stored in one or more registers of a processor, a chip set, and the like. The execution state module puts the second computation module in a computation module execution state identical to the first computation module execution state.

The memory map module copies a memory map of a software process image stored in a first storage system from the first computation module to the second computation module. The memory map describes the logical location of software instructions and data of the software process image in the first storage system. With the memory map, the second computation module may thus execute the software process from the first storage system. In addition, the second computation module may begin executing the software process where the first computation module left off, seamlessly moving the execution of the software process from the first computation module to the second computation module.

In one embodiment, the selection module selects the second computation module such that the second computation module has a response latency from the second computation module to the client as good as the response latency from the first computation module to the client and a storage latency from the second computation module to a second storage system as good as the storage latency from the first computation module to the first storage system. The apparatus seamlessly reassigns the client from the first computation module to the second computation module.

A system of the present invention is also presented to reassign a client. The system may be embodied in a client/server data processing system. In particular, the system, in one embodiment, includes a client, a plurality of blade servers, a selection module, a suspension module, an execution state module, a memory map module, a resumption module, and a process copy module. In a certain embodiment, the system further includes a detection module.

The client may be a computer workstation, a terminal, a server, a mainframe computer, or the like. A user may employ the client to perform data processing tasks. A first blade server executes a software process for the client. In one embodiment, the first blade server is included in a blade center.

In one embodiment, the detection module detects degraded performance of the software process executing on the first blade server and automatically initiates reassignment of the software process in response to the degraded performance. The selection module selects a second blade server that is hardware compatible with the first blade server. The suspension module suspends the software process.

The execution state module copies a blade server execution state of the first blade server to the second server. In addition, the memory map module copies a memory map of a software process image stored in a first storage system from the first blade server to the second blade server. The resumption module resumes the execution of the software process with the software process executing on the second blade server.

The process copy module copies the software process image from the first storage system to a second storage system concurrent with the resumption of execution of the software process. The system thus reassigns the client from the first blade server to the second blade server. In one embodiment, the system reassigns the client to balance the processing load among one or more blade servers.

A method of the present invention is also presented for reassigning a client. The method in the disclosed embodiments substantially includes the steps to carry out the functions presented above with respect to the operation of the described apparatus and system. In one embodiment, the method includes selecting a second computation module, suspending the execution of a software process, copying the computation module execution state from a first computation module to the second computation module, copying the memory map of a software process image from the first computation module to the second computation module, and resuming the software process. The method also may include copying the software process image from the first storage system to a second storage system, recording changes to the software process image while the software process image is copied to the second storage system, and applying the recorded software process image changes to the copy of the software process image on the second storage system.

A selection module selects a second computation module that is hardware compatible with a first computation module that is executing a software process for a client. A suspension module suspends the software process. An execution state module copies a computation module execution state of the first computation module to the second computation module. A memory map module copies a memory map of a software process image stored in a first storage system from the first computation module to the second computation module.

A resumption module resumes the software process executing on the second computation module. A process image copy module may copy the software process image from the first storage system to a second storage system concurrent with the resumption of execution of the software process. In one embodiment, a change record module records changes to the software process image while the software process image is copied to the second storage system. In addition, a change application module may apply the recorded software process image changes to the copy of the software process image on the second storage system. The method seamlessly reassigns the client from the first computation module to the second computation module. In addition, the method may move the software process image from the first storage system to the second storage system.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention reassigns a client from a first computation module to a second computation module by moving the execution of a client software process to the second computation module as with minimal interruption. In addition, the present invention may reassign the client to balance the load among one or more computation modules and to provide the client with an acceptable level of service. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. Reference to a computer readable storage medium may take any form capable of causing execution of a program of machine-readable instructions on a digital processing apparatus. A computer readable storage medium may be embodied by a compact disk, digital-video disk, a magnetic tape, a Bernoulli drive, a magnetic disk, a punch card, flash memory, integrated circuits, or other digital processing apparatus memory device.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
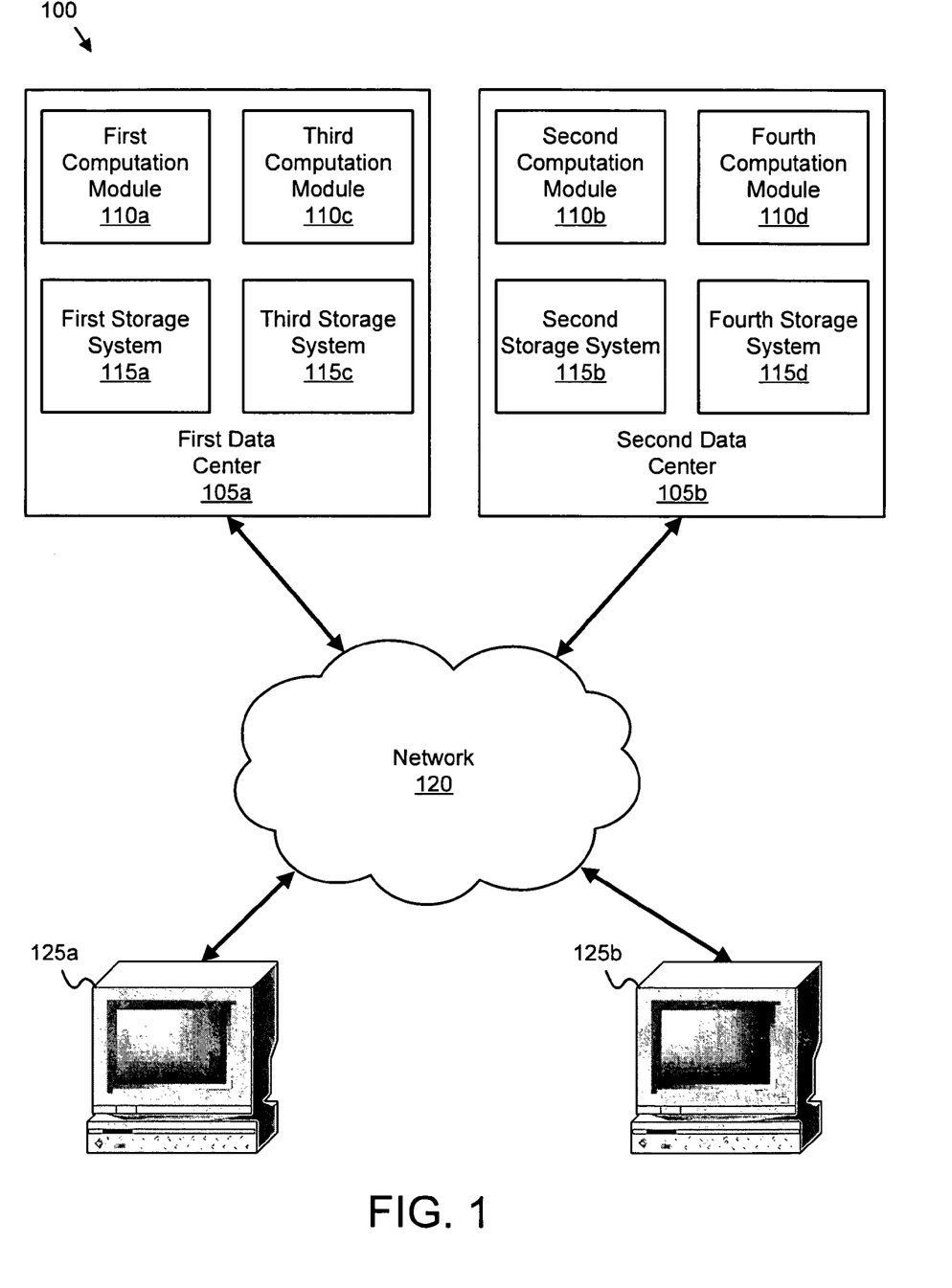
FIG. 1 is a schematic block diagram illustrating one embodiment of a client/server system in accordance with the present invention.

FIG. 1 is a schematic block diagram illustrating one embodiment of a client/server system in accordance with the present invention. The system 100 includes one or more data centers 105, a network 120, and one or more clients 125. Each data center 105 includes one or more computation modules 110 and one or more storage systems 115. Although for simplicity the system 100 is depicted with two data centers 105, one network 120, and two clients 125, and each data center 105 is depicted with two computation modules 110 and two storage systems 115, any number of data centers 105, networks 120, clients 125, computation modules 110, and storage systems 115 may be employed.

The client 125 may be a computer workstation, a terminal, or the like. For example, a user may employ the client 125 to perform one or more data processing tasks such as entering orders into a data base. The client 125 may employ one or more computation modules 110 for data processing services. In one embodiment, the client 125 is configured as a terminal with a display, input/output devices such as a keyboard and mouse, and communication devices. The computation module 110 may execute all software processes for the client 125. For example, computation module 110 may execute a word processing software process for the client 125 with the computation module 110 displaying one or more document views on the client display and receiving input from the client keyboard.

In an alternate embodiment, the client 125 is configured to perform computational functions and may execute one or more software processes. The computation module 110 may execute one or more complimentary software processes for the client 125. For example, the client 125 may be a computer workstation and the computation module 110 may execute a semiconductor layout software process for the client 125.

In one embodiment, each data center 105 is located in a separate physical location. For example, the first and second data centers 105a, 105b may be located in separate facilities. The facilities may be widely separated. Each computation module 110 may be a server. In one embodiment, each computation module 110 is a server blade. A computation module 110 may employ one or more storage systems 115 to store data. A storage system 115 may be a hard disk drive, a soldstate storage device, or the like. For example, the first computation module 110a may store the software process in the first storage system 115a.

The client 125 may communicate a beacon to one or more data centers 105, requesting association with a computation module 110. A data center 105 may respond to the beacon, communicating the data center's 105 ability to associate the client 125 with a computation module 110. The data center 105 may associate the client 125 with a computation module 110 that has sufficient spare processing bandwidth to provide an expected level of service to the client 125. For example, the first data center 105a may associate the first client 125a configured as a terminal with the first computation module 110a because the first computation module 110a has sufficient spare processing bandwidth such that the user cannot distinguish between the performance of the first client 125a and the performance of a stand-alone computer workstation.

A computation module 110 may be associated with one or more clients 125. For example, the first data center 105a may associate the first computation module 110a with the first client 125a and the second client 125b. The first client 125a may employ twenty percent (20%) of the first computation module's 110a processing bandwidth while the second client may employ fifteen percent (15%) of the first computation module's 110a processing bandwidth.

Unfortunately, the processing bandwidth requirements of a client 125 may change. For example, the second client 125b may execute a software process that employs ninety percent (90%) of the first computation module's 110a processing bandwidth. As a result, the first computation module 110a may provide insufficient processing bandwidth to the first client 125a. Thus a user of the first client 125a may experience long delays between inputting data or commands and receiving responses on a display from the first computation module 110a.

The first data center 105a may reassign the first client 125a to the second computation module 110b in the second data center 105b as the second computation module 110b may have sufficient spare processing bandwidth for the first client 125a. Unfortunately, reassigning the first client 125a may further degrade the service to the first client 125a such that a user notices the increased delay. For example, the software process initially executed on the first computation module 110a for the first client 125a may appear completely unresponsive to the first client 125a while the first client 125a is reassigned to the second computation module 110b.

In addition, response latency between the second computation module 110b and the first client 125a may be inadequate to provide the expected level of service to the first client 125a. The response latency is the time required for communications to pass between the computation module 110 and the client 125. The response latency between the first client 125a and the second computation module 110b may be significantly longer than the response latency between the first client and the first computation module 110a, resulting in degraded service for the first client 125a.

The storage latency between the second computation module 110b and a second storage system 115b may also be inadequate for the requirements of the first client 125a. The storage latency is the time required for communications to pass between a computation module 110 and a storage system 115. For example, the first computation module 110a may have a short storage latency while executing a data base software process for the first client 125a if the data base resides on the first storage system 115a. Yet the second computation module 110b may have a long storage latency executing the same data base process for the first client 125a because more time is required for communications to pass between the second computation module 110b and the first storage system 115a.

The system 100 preferably reassigns a client 125 from a first computation module 110a to a second computation module 110b with minimal interruption to a user of the client 125. In addition, the system 100 may reassign the client 125 to a second computation module 110b with a response latency and a storage latency that are as good as the response latency and storage latency of the first computation module 110a.

Figure 2:
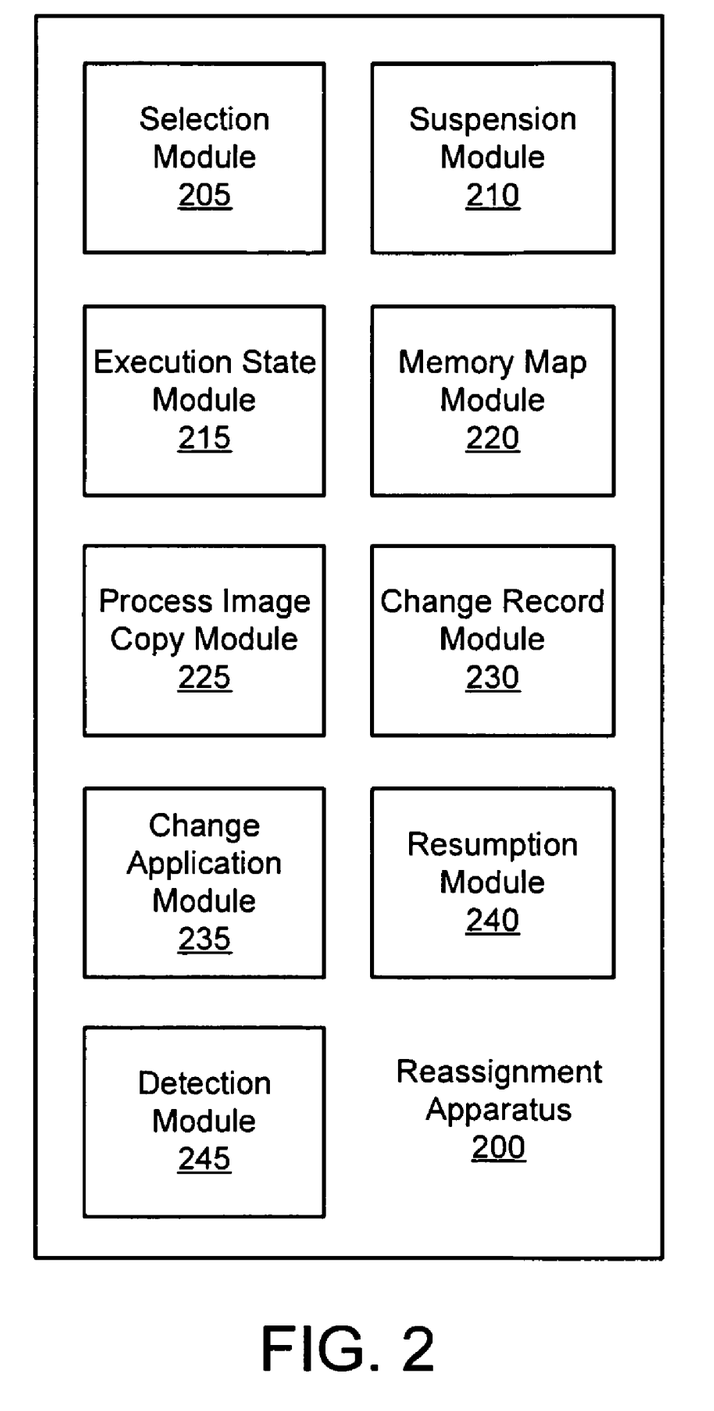
FIG. 2 is a schematic block diagram illustrating one embodiment of a reassignment apparatus of the present invention.

FIG. 2 is a schematic block diagram illustrating one embodiment of a reassignment apparatus 200 of the present invention. The apparatus 200 may be comprised of one or more computation modules 110 of FIG. 1. As depicted, the apparatus 200 includes a selection module 205, a suspension module 210, an execution state module 215, a memory map module 220, a process image copy module 225, a change record module 230, a change application module 235, a resumption module 240, and a detection module 245.

In one embodiment, the detection module 245 detects degraded performance of a client software process executing on a first computation module 110a such as the first computation module 110a of FIG. 1. In a certain embodiment, the detection module 245 monitors processor usage for the first computation module 110a and detects degraded performance if the processor usage exceeds a specified threshold. For example, the detection module 245 may detect degraded performance if the processor usage of the first computation module 115a exceeds eight percent (80%) for a specified time interval. In one embodiment, the detection module 245 automatically initiates reassignment of the software process in response to the degraded performance.

The selection module 205 selects a second computation module 110b such as the second computation module 110b of FIG. 1. The selected second computation module 110b is preferably hardware compatible with a first computation module 110a. For example, the second computation module 110b may have the same processor, chip set, and memory subsystem as the first computation module 110a. Thus the first computation module 110a and the second computation module 110b may be placed in identical execution states with identical values in all registers and identical memory maps.

The selection module 205 may also select the second computation module 110b because the second computation module 110b has spare processing bandwidth to execute the client software process that is currently being executed by the first computation module 110a. Thus, the second computation module 110b may provide the expected level of service to the client 125.

In addition, the selection module 205 may select the second computation module 110b such that the second computation module 110b has a response latency from the second computation module 110b to the client 125 as good as, or better than, the response latency from the first computation module 110a to the client 125. The selection module 205 may also select the second computation module 110b where the storage latency from the second computation module 110b to a storage system 115 such as the second storage system 115b of FIG. 1 is as good as, or better than, the storage latency from the first computation module 110a to the a storage system 115 such as the first or second storage systems 115a, 115b of FIG. 1.

The suspension module 210 suspends the client software process executing on the first computation module 110a. The suspended first computation module 110a does not accept client input such as I/O from a user of the client 125. In addition, the first computation module 110a may not communicate output to the client 125. Although the software process is suspended, the apparatus 200 rapidly and seamlessly reassigns the client 125 and the client software process to minimize the effect on the client 125. Preferably, the reassignment is so short that the user does not notice that a reassignment has occurred.

The execution state module 215 copies an execution state from the first computation module 110a to the second computation module 110b. A computation module 110 execution state may include the values stored in one or more registers such as data registers, one or more instruction pointers, chip set status registers, scratchpad memory, and the like. The execution state of a computation module 110 may also include the values stored for one or more flags, the data values, addresses, and status flags of a cache module including one or more cache modules internal to a processor and one or more cache modules external to the processor, and the like.

For example, the execution state module 215 may copy the hexadecimal address value '00FFEC36x' of a processor instruction pointer, the hexadecimal value '00000100x' of a first processor data register, and the hexadecimal value '00000200x' of a second processor data register from the first computation module 110a to a processor instruction pointer, first data register, and second data register respectively of the second computation module 110b. The execution state module 215 thus puts the second computation module 110b in an execution state identical to the first computation module 110a execution state when execution was suspended. Preferably, the execution state includes the state information for the software processes of the client 125 being reassigned and does not include the execution state information for other processes, such as processes executing for other clients 125.

The memory map module 220 copies a memory map of a software process image stored in a first storage system 115a such as the first storage system of FIG. 1 from the first computation module 110a to the second computation module 110b. The memory map describes the logical location of software instructions and data of the software process image in the first storage system associated with the software process.

For example, the software process image may comprise one thousand twenty-four (1024) thirty-two bit (32b) words of software instructions and data. A computation module 110 may store the software process image in one or more blocks of memory addresses. The computation module 110 may store the software process image beginning at hexadecimal addresses '00FFEC00x,' '00FFE800x,' or the like.

A software instruction may reference one or more additional software instructions or data values within the one or more blocks of memory address using relative addressing. The memory map correlates the relative addresses of the software process image to the actual memory addresses where the software process image is stored. In addition, the memory map may correlate addresses of the software process to additional software processes such as dynamically linked libraries and the like. With the memory map and the execution state of the first computation module 110a copied to the second computation module 110b, the second computation module 110b may thus execute the software process, in certain embodiments, from the first storage system 115a.

In one embodiment, the resumption module 240 resumes execution of the software process by using the second computation module 110b. The second computation module 110b may begin executing the software process where the first computation module 110a left off. For example, if the first computation module 110a suspended executing the software process with a processor instruction pointer address of '00FFEC36x' then the second computation module 110b resumes executing the software process from the first storage system 115a with a processor instruction pointer address of '00FFEC36x.'

In one embodiment, the process image copy module 225 copies the software process image from the first storage system 115a to the second storage system 115b. The process image copy module 225 may copy the software process image concurrent with the resumption of execution of the software process. In a certain embodiment, the change record module 230 records changes to the software process image as the software process image is copied from the first storage system 115a to the second storage system 115b. For example, the change record module 230 may intercept all writes relating to the software process image on the first storage system 115a and record each write in a log file in the memory of the second computation module 110b. The writes may comprise requests, user I/O, software process data changes such as state changes, and the like.

In one embodiment, the change application module 235 applies the recorded changes to the software process image on the first storage system 115a to the software process image on the second storage system 115b. For example, the change application module 235 may apply each write recorded in the log file to the software process image on the second storage system 115b. The apparatus 200 seamlessly moves the execution of the software process from the first computation module to the second computation module, reassigning the client 125 from the first computation module 110a to the second computation module 110b.

Figure 3:
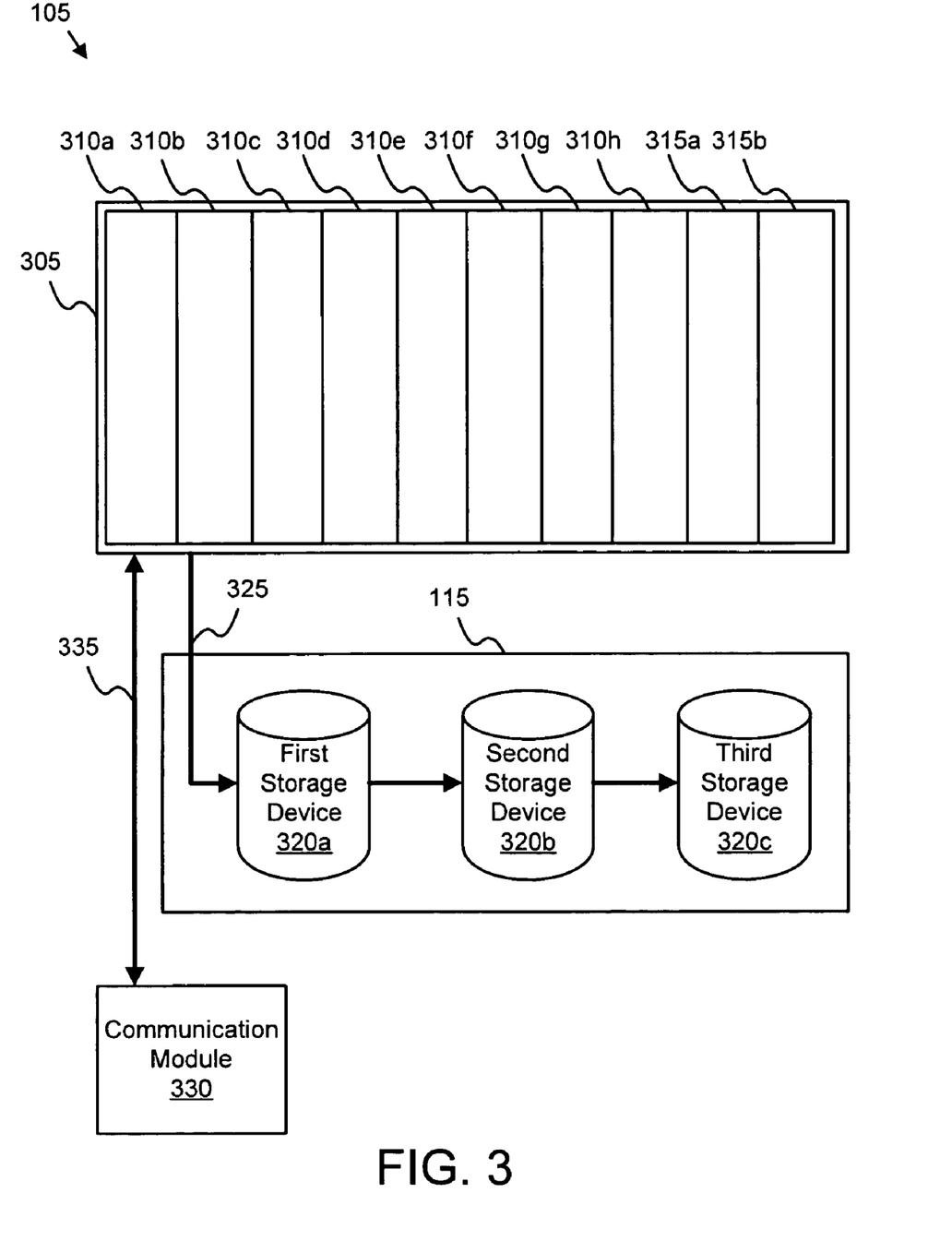
FIG. 3 is a schematic block diagram illustrating one embodiment of a data center in accordance with the present invention.

FIG. 3 is a schematic block diagram illustrating one embodiment of a data center 105 in accordance with the present invention. The data center 105 may be the data center 105 of FIG. 1. In the depicted embodiment, the data center 105 includes an enclosure 305, one or more server blades 310, one or more storage blades 315, a storage system 115, and a communication module 330. Each server blade 310 may be a computation module 110 of FIG. 1. In addition, the storage system 115 may be the storage system 115 of FIG. 1.

The enclosure 305 may be configured as a rack mounted device with a plurality of connectors interconnected through a common backplane. Each server blade 310 connects to the backplane through a connector, accessing power, communication channels, and the like through the backplane. In one embodiment, the storage blade 315 also connects to the backplane. The storage blade 315 may comprise one or more hard disk drives, dynamic random access memory ("DRAM") or the like for use by the server blades 310.

In one embodiment, the enclosure 305 is in communication with the storage system 115 over a storage communication channel 325. The storage communication channel 325 may be a Fibre Channel connection, a small computer system interface ("SCSI") connection, or the like. The storage system 115 may include one or more storage devices 320 such as hard disk drives.

The enclosure 305 may also communicate with the communication module 330 over a network communication channel 335. The network communication channel 335 may be an Ethernet connection, a token-ring connection, or the like. The communication module 330 may be a router or the like in communication with a network 120 such as the network 120 of FIG. 1.

The server blade 310 may execute one or more software processes for a client 125 such as the client 125 of FIG. 1. The server blade 310 may also embody the apparatus 200 of FIG. 2. Although the data center 105 is depicted with one enclosure 305, one communication module 330, and one storage system 115, the data center 105 may employ any number of enclosures 305, communication modules 330, and storage systems 115. In addition, each enclosure 305 may employ any number of server blades 310.

Figure 4:
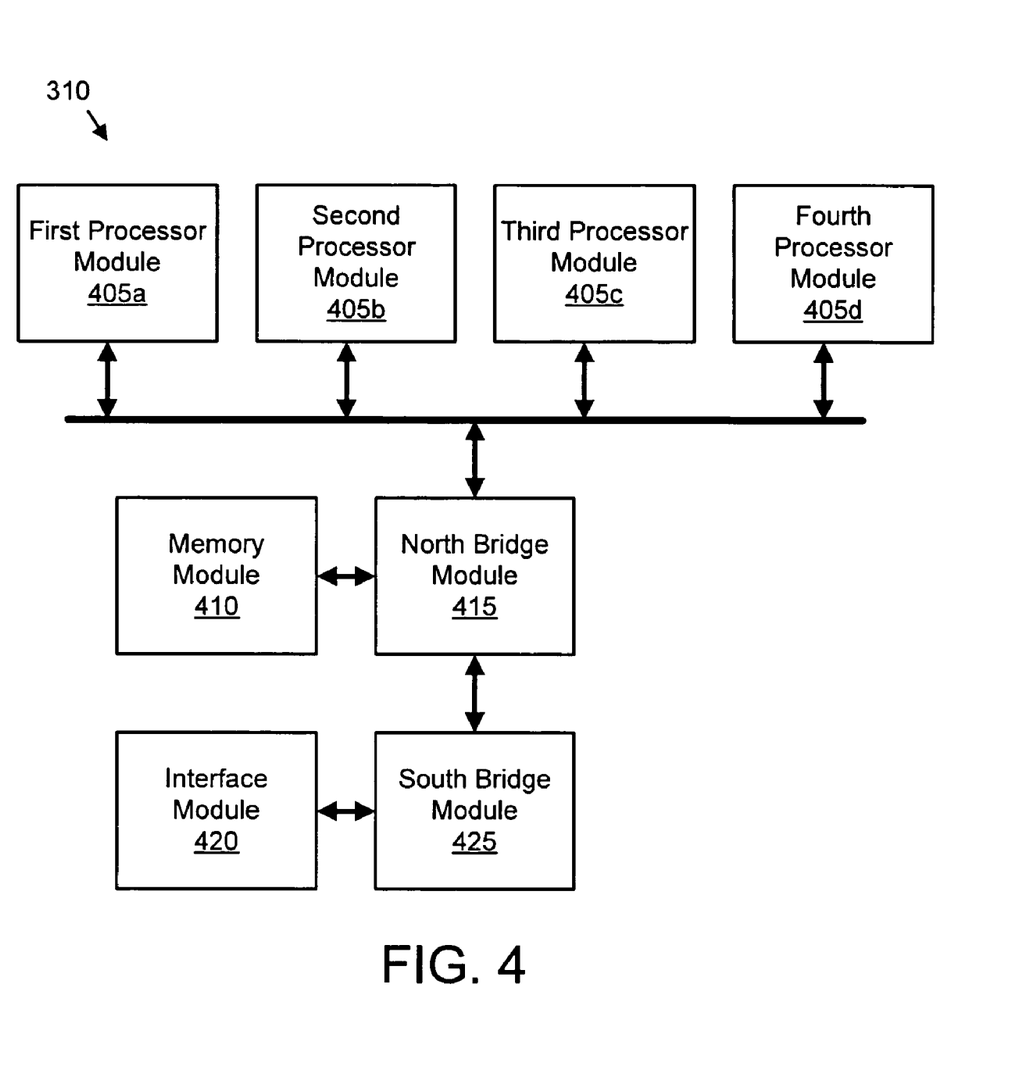
FIG. 4 is a schematic block diagram illustrating one embodiment of a server blade in accordance with the present invention.

FIG. 4 is a schematic block diagram illustrating one embodiment of a server blade 310 in accordance with the present invention. The server blade 310 includes one or more processor modules 405, a memory module 410, a north bridge module 415, an interface module 420, and a south bridge module 425. Although for simplicity the server blade 310 is depicted with four processor modules 405, the server blade may employ any number of processor modules 405.

The processor module 405, memory module 410, north bridge module 415, interface module 420, and south bridge module 425, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate to substrate wiring, or circuit card traces or wires connecting the semiconductor devices.

The memory module 410 stores software instructions and data. The processor module 405 executes the software instructions and manipulates the data as is well know to those skilled in the art. In one embodiment, the memory module 410 stores and the processor module 405 executes software instructions and data comprising the selection module 205, the suspension module 210, the execution state module 215, the memory map module 220, the process image copy module 225, the change record module 230, the change application module 235, the resumption module 240, and the detection module 245 of FIG. 2.

In one embodiment, the processor module 405 communicates with a communication module 330 such as the communication module 330 of FIG. 3 through the north bridge module 415, the south bridge module 425, and the interface module 420. The processor module 405 may communicate with a client 125 such as the client 125 of FIG. 1 through the communication module 330.

The schematic flow chart diagrams that follow are generally set forth as logical flow chart diagrams. As such, the depicted order and labeled steps are indicative of one embodiment of the presented method. One skilled in the art may reorder the steps, or conceive other steps and methods that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
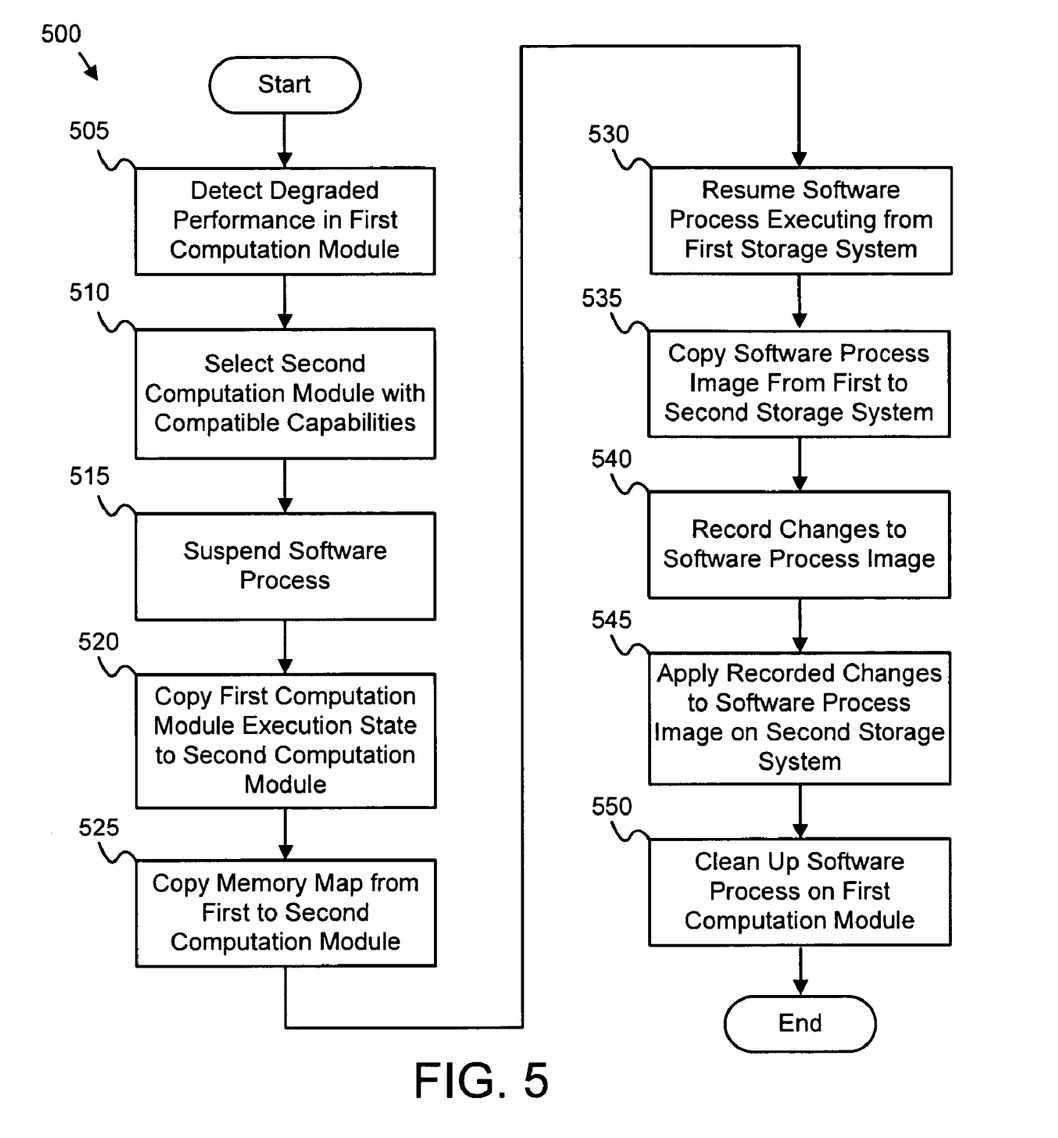
FIG. 5 is a schematic flow chart diagram illustrating one embodiment of a reassignment method of the present invention.

FIG. 5 is a schematic flow chart diagram illustrating one embodiment of a reassignment method 500 of the present invention. The method 500 substantially includes the steps necessary to carry out the functions presented above with respect to the operation of the described apparatus 200 of FIG. 2 and system 100 of FIG. 1.

In one embodiment, the method 500 begins and a detection module 245 detects 505 degraded performance of a software process executing on a first computation module 110a such as the first computation module 110a for FIG. 1. The software process is executed for a client 125 such as the client 125 of FIG. 1. The detection module 245 may detect 505 the degraded performance by monitoring the time the software process waits for processor bandwidth on the first computation module 110a. For example, the detection module 245 may detect 505 degraded performance if the software process waits for more than two seconds (2 s) for processor bandwidth. In addition, the detection module 245 may automatically initiate reassignment of the software process in response to the degraded performance.

A selection module 205 selects 510 a second computation module 110b such as the second computation module 110b of FIG. 1. The second computation module 110b is preferably hardware compatible with a first computation module 110a. In a certain embodiment, the first computation module 110a is a server blade 310 such as the first server blade 310a of FIG. 3 and the selection module 205 selects 510 a second server blade 310b identical to the first server blade 310a.

A suspension module 210 suspends 515 the software process. In one embodiment, the suspension module 210 suspends 515 the software process by interrupting the software process and saving the execution state of the first computation module 110a to a stack. In one embodiment, the suspension module 210 employs a software interrupt to suspend 515 the software process. In an alternate embodiment, the suspension module 210 employs a hardware interrupt to suspend 515 the software process. The stack may by one or more memory locations in the memory module 410 of FIG. 4 configured as a first in/first out memory as is well known to those skilled in the art.

An execution state module 215 copies 520 the first computation module execution state to the second computation module 110b. In one embodiment, the execution state module 215 interrupts the second computation module 110b, saving any other software processes executing on the second computation module 110b, and spawns an interim software process on the second computation module 110b. The interim software process may manage receiving the software process at the second computation module 110b. The execution state module 215 may further copy 520 the first computation module execution state from the stack to the second computation module 110b.

A memory map module 220 copies 525 a memory map of the software process image stored in a first storage system 115a such as the first storage system 115a of FIG. 1 from the first computation module 110a to the second computation module 110b. In one embodiment, the memory map module 220 copies 525 the memory map residing in the memory module 410 of FIG. 4 of the first blade server 310a to the memory module 410 of the second blade server 310b. In one embodiment, the second computation module 110b is enabled to execute the software process image from the first storage system 115a using the copied memory map. The second computation module 110b may execute the whole software process image or portions of the software process image from the first storage system 115a. In one embodiment, pointers in the memory map that point to the storage system 115 may include an identifier that distinguishes between the first storage system 115a and the second storage system 115b.

In one embodiment, a resumption module 240 resumes 530 the software process executing on the second computation module 110b. The resumption module 240 may direct the interim software process to fetch and execute the address value of the processor instruction pointer of the software process when suspended on the first computation module

110*a* to resume 530 the software process. For example, if the suspension module 210 suspended 515 the software process when the instruction pointer address value held a first address, the interim software process may fetch the instruction from the first address from the first storage system 115*a* and execute the instruction on the second computation module 110*b*.

In one embodiment, a process image copy module 225 copies 535 the software process image from the first storage system 115*a* to a second storage system 115*b* such as the second storage system 115*b* of FIG. 1. The process image copy module 225 may copy 535 the software process image concurrent with resumption of execution of the software process. In a certain embodiment, the process image copy module 225 modifies the memory map of the second computation module 110*b* as blocks of the software process image are copied 535 to the second storage system 115*b*.

In one embodiment, a change record module 230 records 540 changes to the software process image while the software process image is copied to the second storage system 115*b*. In addition, a change application module 235 may apply 545 the recorded software process image changes to the copy of the software process image on the second storage system 115*b*. Thus, the second computation module 110*b* may continue to execute and modify the software process image on the first storage system 115*a* while the software process image is copied to the second storage system 115*b*.

In one embodiment, the resumption module 240 cleans up 550 the software process from the first computation module 110*a* and the method 500 terminates. For example, the resumption module 240 may stop any portions of the software process executing on the first computation module 110*a*. In addition, the resumption module 240 may free memory used by the software process on the first computation module 110*a*.

The method 500 reassigns the client 125 from the first computation module 110*a* to the second computation module 110*b* by moving a client 125 software process from executing on the first computation module 110*a* to executing on the second computation module 110*b*. Although the method 500 is depicted as reassigning the client 125 by moving one software process, the method 500 may reassign the client 125 by moving any number of client 125 software processes. The method 500 may be used to balance the load among a plurality of computation modules 110 by reassigning one or more clients 125.

Figure 6:
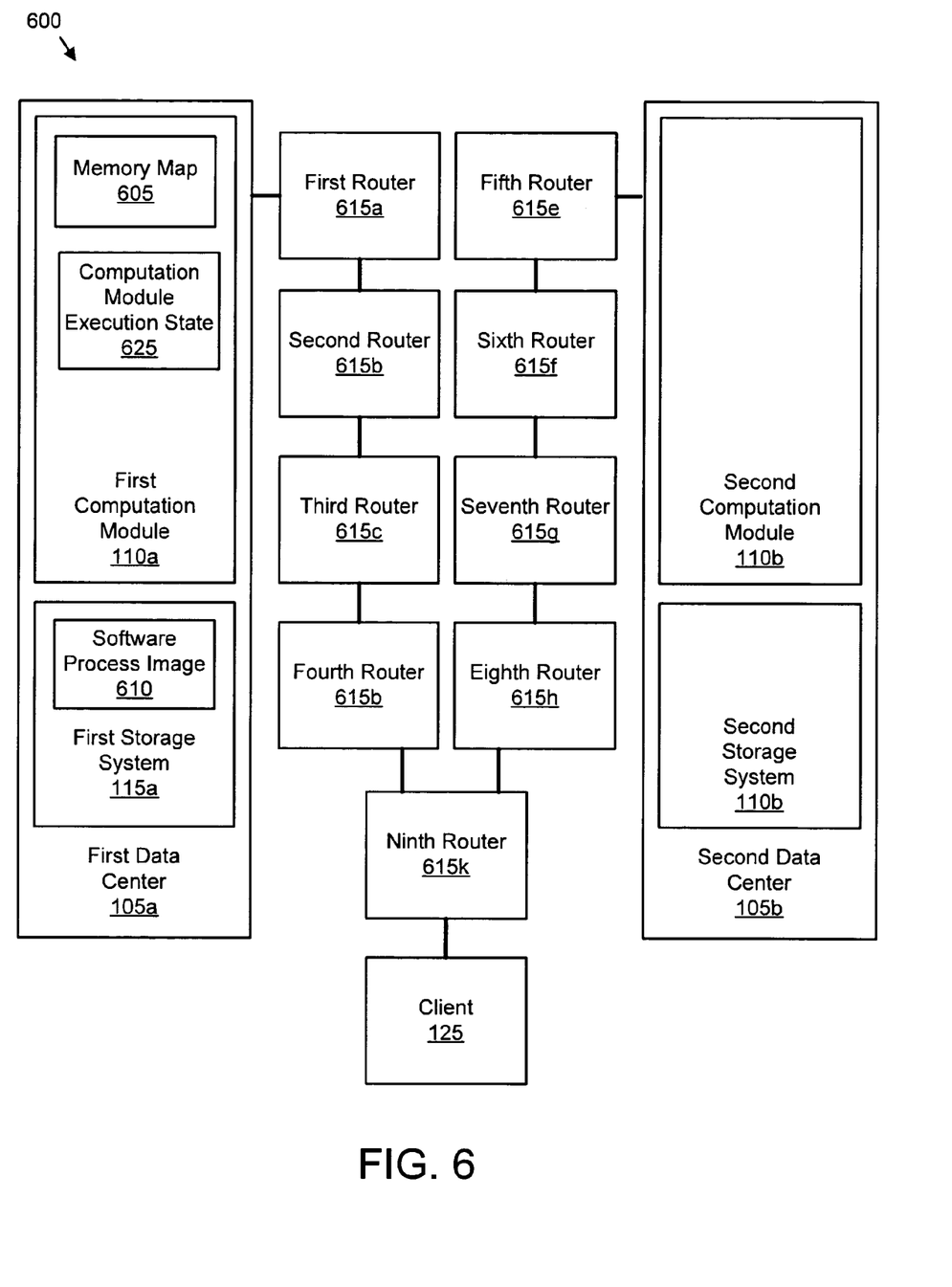
FIG. 6 is a schematic block diagram illustrating one embodiment of client reassignment in accordance with the present invention.

FIG. 6 is a schematic block diagram illustrating one embodiment of client reassignment 600 in accordance with the present invention. A first and second data center 105*a*, 105*b* are depicted in communication with a client 125 through a plurality of routers 615. The data centers 105 and client 125 may comprise the data centers 105 and client 125 of FIG. 1 while the routers 615 may embody the network 120 of FIG. 1.

A first computation module 110*a* executes a software process for the client 125. The first storage system 115*a* stores the software process image 610. The first computation module 110*a* includes a memory map 605 to the software process image 610 and is configured with a computation module execution state 625 for executing the software process.

A detection module 245 such as the detection module 245 of FIG. 2 may detect 505 degraded software process performance. A selection module 205 such as the selection module 205 of FIG. 2 may select 510 the second computation module 110*b* to reassign the client 125 to from the first computation module 110*a*. In the depicted embodiment, the selection module 205 selects 510 the second computation module 110*a* because the second computation module 110*b* is identical to the first computation module 110*a* and because the response latency between the second computation module 110*b* and the client 125 is as good as the response latency between the first computation module 110*a* and the client 125. For example, in the depicted embodiment communications between the first computation module 110*a* and the client 125 pass through the same number of routers 615 as communications between the second computation module 110*b* and the client 125, indicating that the response latencies are similar.

Figure 7:
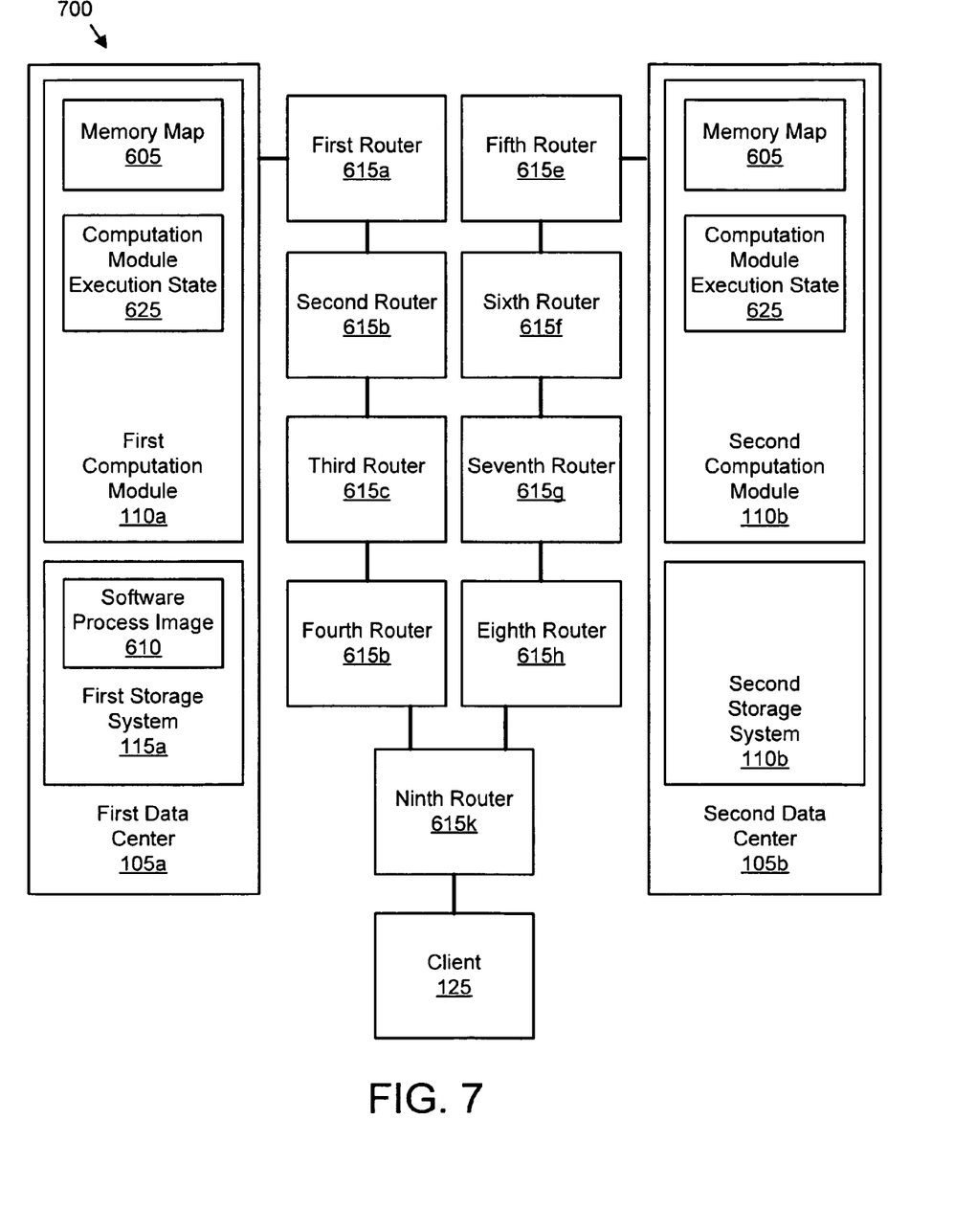
FIG. 7 is a schematic block diagram illustrating one embodiment of a system for copying a computation module execution state and memory map in accordance with the present invention.

FIG. 7 is a schematic block diagram illustrating one embodiment of a system 700 for copying a computation module execution state and memory map in accordance with the present invention. The modules of FIG. 6 are depicted wherein a suspension module 205 suspends 515 the software process. An execution state module 215 copies 520 the computation module execution state 625 of the first computation module 110*a* to the second computation module 110*b*.

In addition, a memory map module 220 copies 525 the memory map 605 from the first computation module 110*a* to the second computation module 110*b*. A resumption module 240 resumes 530 the execution of the software process by the second computation module 110*b* with the second computation module 110*b* using the software process image 610 stored in the first storage system 115*a*.

Figure 8:
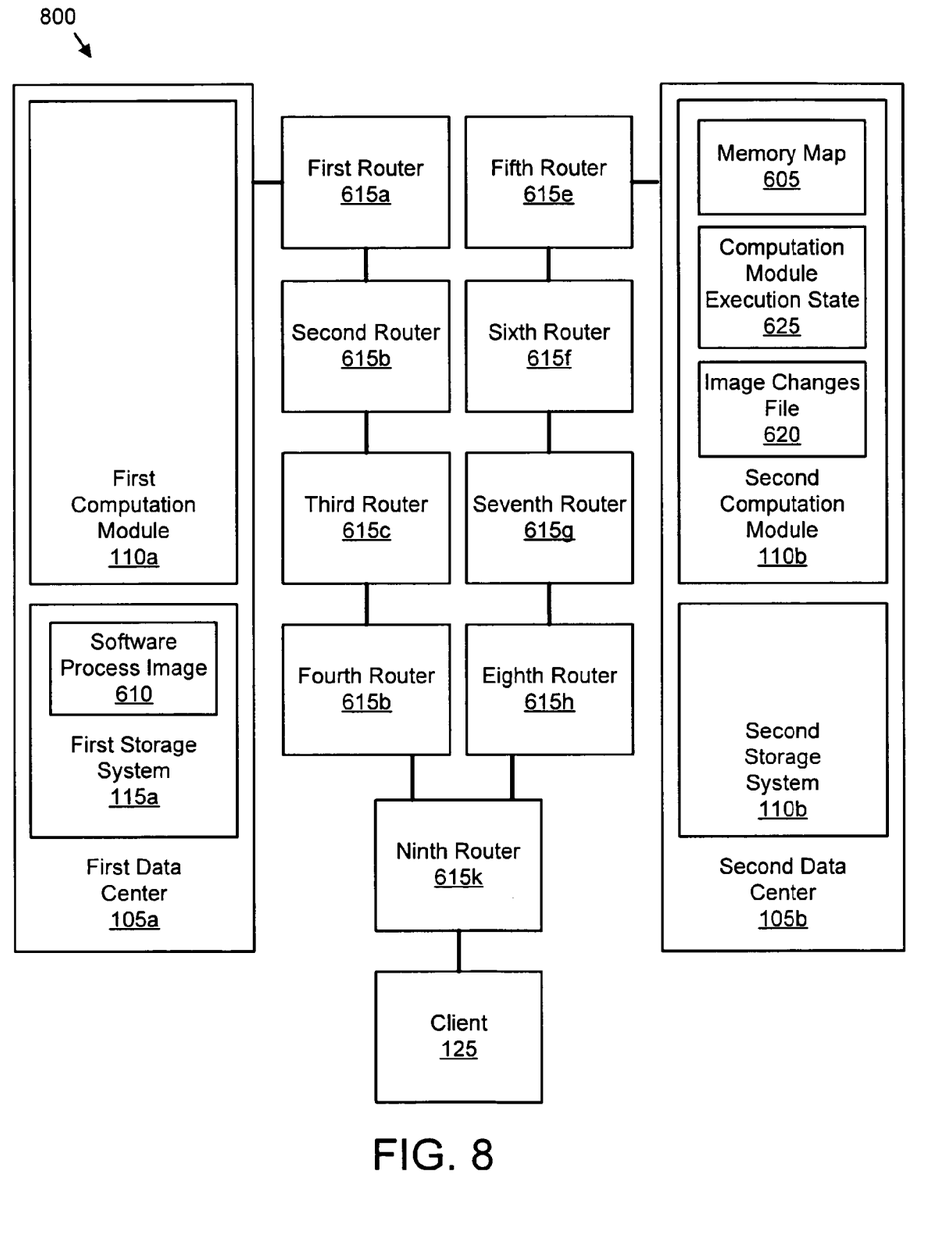
FIG. 8 is a schematic block diagram illustrating one embodiment of a system for copying a software process image in accordance with the present invention.

FIG. 8 is a schematic block diagram illustrating one embodiment of a system 800 for copying a software process image in accordance with the present invention. The modules of FIG. 7 are depicted wherein a process image copy module 225 copies 535 the software process image 610 from the first storage system 115*a* to the second storage system 115*b*. In one embodiment, a change record module 230 records 540 changes to the software process image 610 as the software process image 610 is copied 535 to an image changes file 620. The image changes file 620 may be a log file residing on the second computation module 110*b*.

Figure 9:
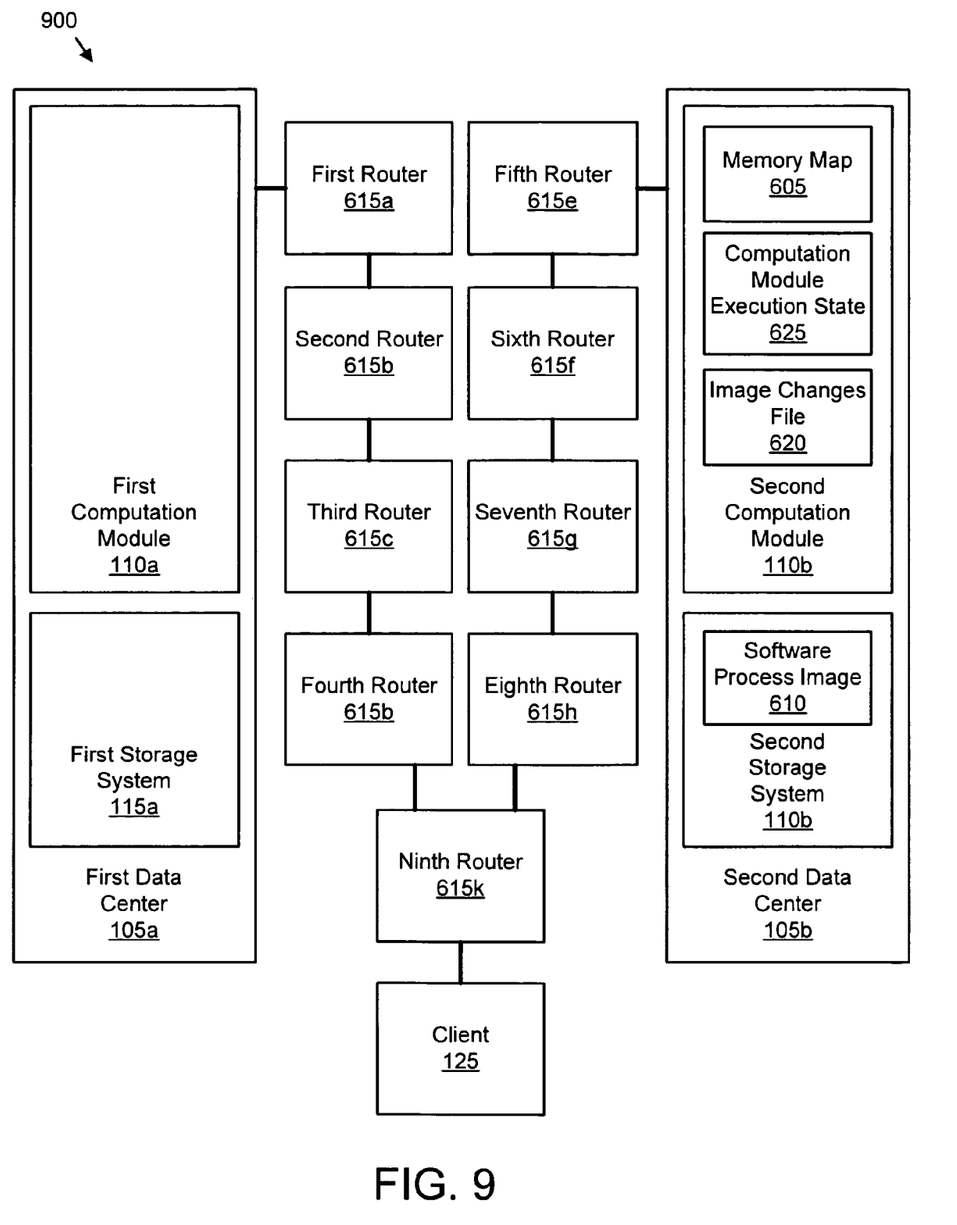
FIG. 9 is a schematic block diagram illustrating one embodiment of applying software process image changes in accordance with the present invention.

FIG. 9 is a schematic block diagram illustrating one embodiment of applying software process image changes 900 in accordance with the present invention. The modules of FIG. 8 are depicted wherein an instance of the software process image 610 resides on the second computation module 110*b*. The second computation module 110*b* may employ the software process image 610 in executing the software process. In one embodiment, a change application module 235 applies 545 the recorded software process image changes of the image changes file 620 to the instance of the software process image 610 residing in the second storage system 110*b*.

The present invention reassigns a client 125 from a first computation module 110*a* to a second computation module 110*b* by moving the execution of a client 125 software process to the second computation module 110*b*. In addition, the present invention reassigns the client 125 in a transparent manner by copying the computation module execution state 625 and memory map 605 so that the second computation module 110*b* may seamlessly resume 530 executing the software process. The present invention may reassign the client 125 to balance the load among one or more computation modules 110 and/or to provide the client 125 with an acceptable level of service.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to reassign a client, the apparatus comprising:
   a selection module that selects a second computation module with hardware compatible to a first computation module, the first computation module executing a software process for a client, the first computation module executing the software process from a software process image stored in a first storage system;
   a suspension module that suspends the software process such that the first computation module does not accept a client input;
   an execution state module that copies a computation module execution state from the first computation module to the second computation module;
   a memory map module that copies a memory map of the software process image stored in the first storage system from the first computation module to the second computation module, the memory map comprising addresses referring to the first storage system;
   a resumption module that resumes execution of the software process with the second computation module executing the software process from the software process image stored in the first storage system based on the copied memory map on the second computation module in response to the memory map module copying the memory map from the first computation module to the second computation module;
   a process image copy module that copies the software process image from the first storage system to a second storage system concurrent with the resumption of execution of the software process and modifies one or more addresses of the copied memory map on the second computation module to refer to the second storage system during execution of the software process by the second computation module in response to copying a block of the software process image to the second storage system, the block corresponding to the one or more addresses; and
   wherein the selection module, suspension module, execution module, memory map module, resumption module, and process image copy module comprise one or more of logic hardware and executable code, the executable code stored on a computer readable storage medium.

2. The apparatus of claim 1, further comprising a change record module that records changes to the software process image as the software process image is copied from the first storage system to the second storage system.

3. The apparatus of claim 2, further comprising a change application module that applies the recorded software process image changes to the copy of the software process image on the second storage system.

4. The apparatus of claim 1, wherein each computation module is configured as a server blade.

5. The apparatus of claim 1, wherein the second computation module has a response latency from the second computation module to the client as good as the response latency from the first computation module to the client and a storage latency from the second computation module to a second storage system as good as the storage latency from the first computation module to the first storage system.

6. The apparatus of claim 1, further comprising a detection module that detects degraded performance of the software process executing on the first computation module and automatically initiates reassignment of the software process in response to the degraded performance.

7. A computer readable storage medium tangibly embodying a program of machine-readable instructions executable by a digital processing apparatus to perform operations to reassign a client, the operations comprising:
   selecting a second computation module with hardware compatible to a first computation module executing a software process for a client, the first computation module executing the software process from a software process image stored in a first storage system;
   suspending the software process wherein the first computation module does not accept a client input;
   copying a computation module execution state from the first computation module to the second computation module;
   copying a memory map of the software process image stored in the first storage system from the first computation module to the second computation module, the memory map comprising addresses referring to the first storage system;
   resuming execution of the software process with the second computation module executing the software process using the software process image stored in the first storage system based on the copied memory map on the second computation module in response to copying the memory map from the first computation module to the second computation module;
   copying the software process image from the first storage system to a second storage system concurrent with the resumption of execution of the software process; and
   modifying one or more addresses of the copied memory map on the second computation module to refer to the second storage system during execution of the software process by the second computation module in response to copying a block of the software process image to the second storage system, the block corresponding to the one or more addresses.

8. The computer readable storage medium of claim 7, wherein each computation module is configured as a server blade.

9. The computer readable storage medium of claim 7, wherein the second computation module has a response latency from the second computation module to the client as good as the response latency from the first computation module to the client and a storage latency from the second computation module to a second storage system as good as the storage latency from the first computation module to the first storage system.

10. The computer readable storage medium of claim 7, wherein the instructions further comprise an operation to record changes to the software process image as the image is copied from the first storage system to the second storage system.

11. The computer readable storage medium of claim 10, wherein the instructions further comprise an operation to apply the recorded software process image changes to the copy of the software process image on the second storage system.

12. The computer readable storage medium of claim 11, wherein the instructions further comprise an operation to detect degraded performance of the software process executing on the first computation module and automatically initiate reassignment of the software process in response to the degraded performance.

13. A system to reassign a client, the system comprising:
a client;
a plurality of server blades;
a selection module that selects a second server blade with hardware compatible to a first server blade executing a software process for a client, the first server blade executing the software process from a software process image stored in a first storage system;
a suspension module that suspends the software process such that the first server blade does not accept a client input;
an execution state module that copies a server blade execution state from the first server blade to the second server blade;
a memory map module that copies a memory map of the software process image stored in the first storage system from the first server blade to the second server blade, the memory map comprising addresses referring to the first storage system;
a resumption module that resumes execution of the software process with the server blade executing the software process from the software process image stored in the first storage system based on the copied memory map on the second server blade in response to the memory map module copying the memory map from the first server blade to the second server blade;
a process image copy module that copies the software process image from the first storage system to a second storage system concurrent with the resumption of execution of the software process and modifies one or more addresses of the copied memory map on the second server blade to refer to the second storage system during execution of the software process by the second computation module in response to copying a block of the software process image to the second storage system, the block corresponding to the one or more addresses.

14. The system of claim 13, wherein the second server blade has a response latency from the second server blade to the client as good as the response latency from the first server blade to the client and a storage latency from the second server blade to the second storage system as good as the storage latency from the first server blade to the first storage system.

15. A method for deploying computer infrastructure, comprising integrating computer-readable code in to a computing system, wherein the code in combination with the computing system performs the following:
detecting degraded performance of a software process executing on a first computation module for a client, the first computation module executing the software process from a software process image stored in a first storage system;
automatically initiating reassignment of the software process in response to the degraded performance;
selecting a second computation module with hardware compatible to the first computation module;
suspending the software process wherein the first computation module does not accept a client input;
copying a computation module execution state from the first computation module to the second computation module;
copying a memory map of the software process image stored in the first storage system from the first computation module to the second computation module, the memory map comprising addresses referring to the first storage system;
resuming execution of the software process with the second computation module executing the software process using the software process image stored in the first storage system based on the copied memory map on the second computation module in response to copying the memory map from the first computation module to the second computation module;
copying the software process image from the first storage system to a second storage system concurrent with the resumption of execution of the software process; and
modifying one or more addresses of the copied memory map on the second computation module to refer to the second storage system during execution of the software process by the second computation module in response to copying a block of the software process image to the second storage system, the block corresponding to the one or more addresses.

16. The method of claim 15, wherein the second computation module has a response latency from the second computation module to the client as good as the response latency from the first computation module to the client and a storage latency from the second computation module to a second storage system as good as the storage latency from the first computation module to the first storage system.

17. The method of claim 15, further comprising recording changes to the software process image as the image is copied from the first storage system to the second storage system and applying the recorded software process image changes to the copy of the software process image on the second storage system.

* * * * *